(12) United States Patent
Okamoto

(10) Patent No.: US 9,375,846 B2
(45) Date of Patent: Jun. 28, 2016

(54) TRANSFER APPARATUS AND TRANSFER METHOD

(71) Applicant: TOYOTA JIDOSHA KABUSHIKI KAISHA, Toyota-shi, Aichi-ken (JP)

(72) Inventor: Kazuya Okamoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/339,873

(22) Filed: Jul. 24, 2014

(65) Prior Publication Data

US 2015/0037129 A1    Feb. 5, 2015

(30) Foreign Application Priority Data

Aug. 5, 2013  (JP) ................. 2013-162274

(51) Int. Cl.
*B25J 15/12* (2006.01)
*B25J 11/00* (2006.01)
*B65G 1/04* (2006.01)

(52) U.S. Cl.
CPC ............. *B25J 11/005* (2013.01); *B65G 1/0435* (2013.01)

(58) Field of Classification Search
CPC .................................................. B65G 1/04
USPC ............... 294/81.2, 81.54, 86.41, 100, 119.1;
198/345.1, 346.2, 346.3, 576, 577,
198/617, 967.08; 414/782, 783, 784;
901/31, 36
See application file for complete search history.

(56) References Cited

U.S. PATENT DOCUMENTS

| | | | | |
|---|---|---|---|---|
| 3,306,646 A * | 2/1967 | Flora, Jr. ................. | B66C 1/427 | 294/106 |
| 4,579,380 A * | 4/1986 | Zaremsky ............. | B25J 13/082 | 294/119.1 |
| 7,300,084 B2 * | 11/2007 | Chae ........................ | B25J 9/023 | 294/119.1 |
| 7,670,555 B2 * | 3/2010 | Hoover .................... | B25J 9/023 | 294/119.1 |
| 7,891,967 B2 * | 2/2011 | Brussel ................... | B29C 31/08 | 198/456 |
| 8,388,035 B2 * | 3/2013 | Kamon ................ | B25J 15/0266 | 294/106 |
| 8,596,699 B2 * | 12/2013 | Sdahl .................. | B25J 15/0253 | 294/196 |
| 8,622,684 B2 * | 1/2014 | Bao ........................ | B65G 47/88 | 414/781 |
| 8,684,432 B2 * | 4/2014 | Saka ........................ | B25J 15/08 | 294/119.1 |
| 8,899,649 B2 * | 12/2014 | Li ........................ | C25D 11/005 | 294/119.1 |
| 2011/0008138 A1 | 1/2011 | Yamashita | | |

FOREIGN PATENT DOCUMENTS

| | | |
|---|---|---|
| CN | 202754396 U | 2/2013 |
| JP | 2003-312809 A | 11/2003 |
| JP | 2006-160496 A | 6/2006 |
| JP | 2011-225357 | 11/2011 |
| JP | 2011-225373 | 11/2011 |
| WO | WO 2010-049987 A1 | 5/2010 |

* cited by examiner

*Primary Examiner* — Douglas Hess
(74) *Attorney, Agent, or Firm* — Finnegan, Henderson, Farabow, Garrett & Dunner, LLP

(57) ABSTRACT

A transfer apparatus includes a pair of hand units, a gripping mechanism that grips and releases an object by changing an interval between a pair of hands, a servomotor for a gripping action that drives the gripping mechanism, at least one spline shaft that supports the pair of hands so that the hands are able to move, a servomotor for an extending and contracting action that rotates the spline shaft, and an extension and contraction mechanism that is extended and contracted by rotation of the spline shaft so that the hands move to a gripping position or a releasing position.

10 Claims, 8 Drawing Sheets

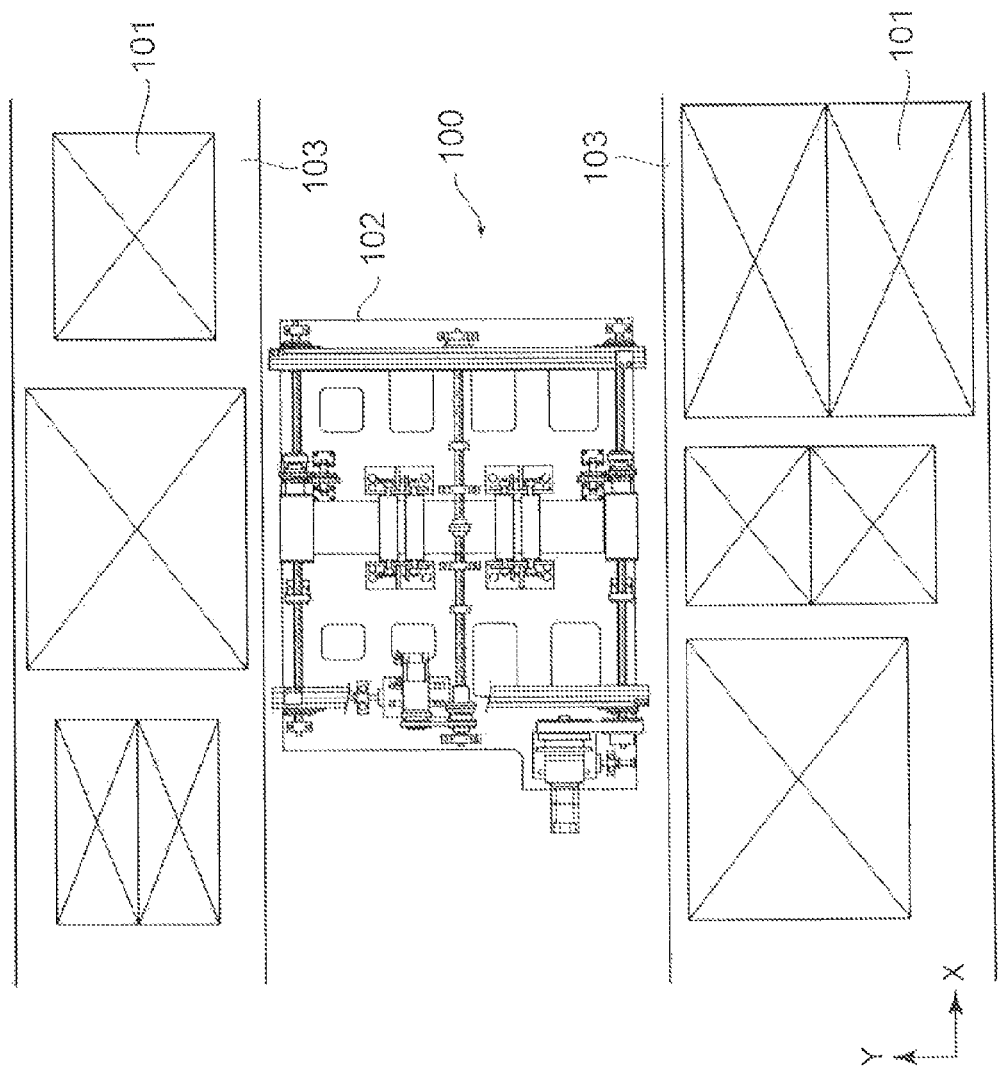
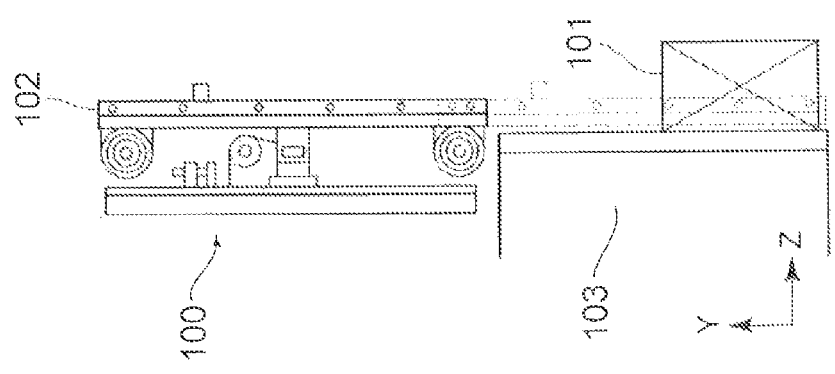

TRANSFER APPARATUS AND TRANSFER METHOD

INCORPORATION BY REFERENCE

The disclosure of Japanese Patent Application No. 2013-162274 filed on Aug. 5, 2013 including the specification, drawings and abstract is incorporated herein by reference in its entirety.

BACKGROUND OF THE INVENTION

1. Field of the Invention

The invention relates to a transfer apparatus and a transfer method.

2. Description of Related Art

A transfer apparatus for transferring articles is used in a manufacturing line. An article transfer apparatus described in Japanese Patent Application Publication No. 2011-225357 (JP 2011-225357 A) includes a pair of article holders provided to be able to move toward and away from each other. By driving the article holders by electric motors, respectively, the article holders are moved in an advancing and retracting fashion.

In the article transfer apparatus described in JP 2011-225357 A, the pair of article holders (hands) is respectively guided and supported by guide rails for advancement and retraction so as to be able to move. Then, a pair of electric motors for advancing and retracting movements moves the pair of article holders in an advancing and retracting direction. Further, the pair of article holders is guided and supported to be able to move in a breadth direction. An electric motor for toward and away movements allows the article holders to move toward and away from each other.

Further, a conveyer is provided between the pair of article holders. An electric motor for a conveyer drives and rotates the conveyer in a forward and reverse direction. The conveyer moves an article jointly with an advancing and retracting movement of the article holders. As stated above, in the article transfer apparatus described in JP 2011-225357 A, the electric motor for a conveyer, the electric motor for toward and away movements, and the pair of electric motors for advancing and retracting movements are provided.

A simpler structure for such a transfer apparatus is demanded. In other words, when appropriate transfer is carried out with a simpler structure, costs are reduced.

SUMMARY OF THE INVENTION

The invention provides a transfer apparatus and a transfer method, by which transfer is carried out with a simple structure.

A transfer apparatus according to an aspect of the invention includes a gripping mechanism that grips and releases an object by changing an interval between a pair of hands, a gripping driving portion that drives the gripping mechanism, at least one shaft that supports the pair of hands so that the hands are able to move, a shaft driving portion that rotates the shaft, and an extension and contraction mechanism that is extended and contracted by rotation of the shaft so that the hands move to a gripping position or a releasing position.

The above-mentioned transfer apparatus may further include a conveyer belt on which the object gripped by the gripping mechanism is placed, and a transmission mechanism that transmits rotation of the shaft to the conveyer belt.

In the above-mentioned transfer apparatus, conveyance speed of the conveyer belt on a conveying surface and extension and contraction speed of the extension and contraction mechanism may be equalized.

The above-mentioned transfer apparatus may also include a clutch that blocks power transmission from the shaft to the conveyer belt.

The above-mentioned transfer apparatus may include a slider board on which the object gripped by the gripping mechanism is placed, and the object may slide on the slider board due to an extending and contracting action of the extension and contraction mechanism.

In the above-mentioned transfer apparatus, the shaft may include a first shaft, and a second shaft that is provided to be separated from the first shaft in an extending and contracting direction of the extension and contraction mechanism.

A transfer method according to this embodiment includes driving a gripping driving portion so as to narrow an interval between a pair of hands supported by a shaft so that the hands are able to move, gripping an object by using the gripping driving portion by moving the pair of hands towards each other along the shaft, rotating the shaft by using a shaft driving portion in a state where the pair of hands grips the object, extending and contracting an extension and contraction mechanism of the pair of hands by rotation of the shaft, moving the pair of hands to a releasing position of the object by extension and contraction of the extension and contraction mechanism, and releasing the object as the gripping driving portion drives the pair of hands that has moved to the releasing position.

The above-mentioned transfer method may further include placing the object gripped by the pair of hands onto a conveyer belt by extending and contracting the extension and contraction mechanism, and the conveyer belt may rotate due to rotation of the shaft.

In the above-mentioned transfer method, conveyance speed of the conveyer belt on a conveying surface and extension and contraction speed of the pair of hands may be equalized.

The above-mentioned transfer method may further include blocking power transmission from the shaft to the conveyer belt by using a clutch, and extending and contracting the pair of hands in a state where the clutch blocks power transmission to the conveyer belt and the object is released from the pair of hands.

The above-mentioned transfer method may further include placing the object gripped by the pair of hands onto a slider board by extending and contracting the extension and contraction mechanism, and the object may slide on the slider board due to extension and contraction of the pair of hands.

In the above-mentioned transfer method, the shaft may include a first shaft, and a second shaft that is provided to be separated from the first shaft in an extending and contracting direction of the extension and contraction mechanism.

According to the aspect of the invention, it is possible to provide a transfer apparatus and a transfer method by which transfer is carried out with a simple structure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1A is a side view showing an overall structure of an transfer apparatus, and FIG. 1B is a top view showing the overall structure of the transfer apparatus;

DETAILED DESCRIPTION OF EMBODIMENTS

Figure 2:
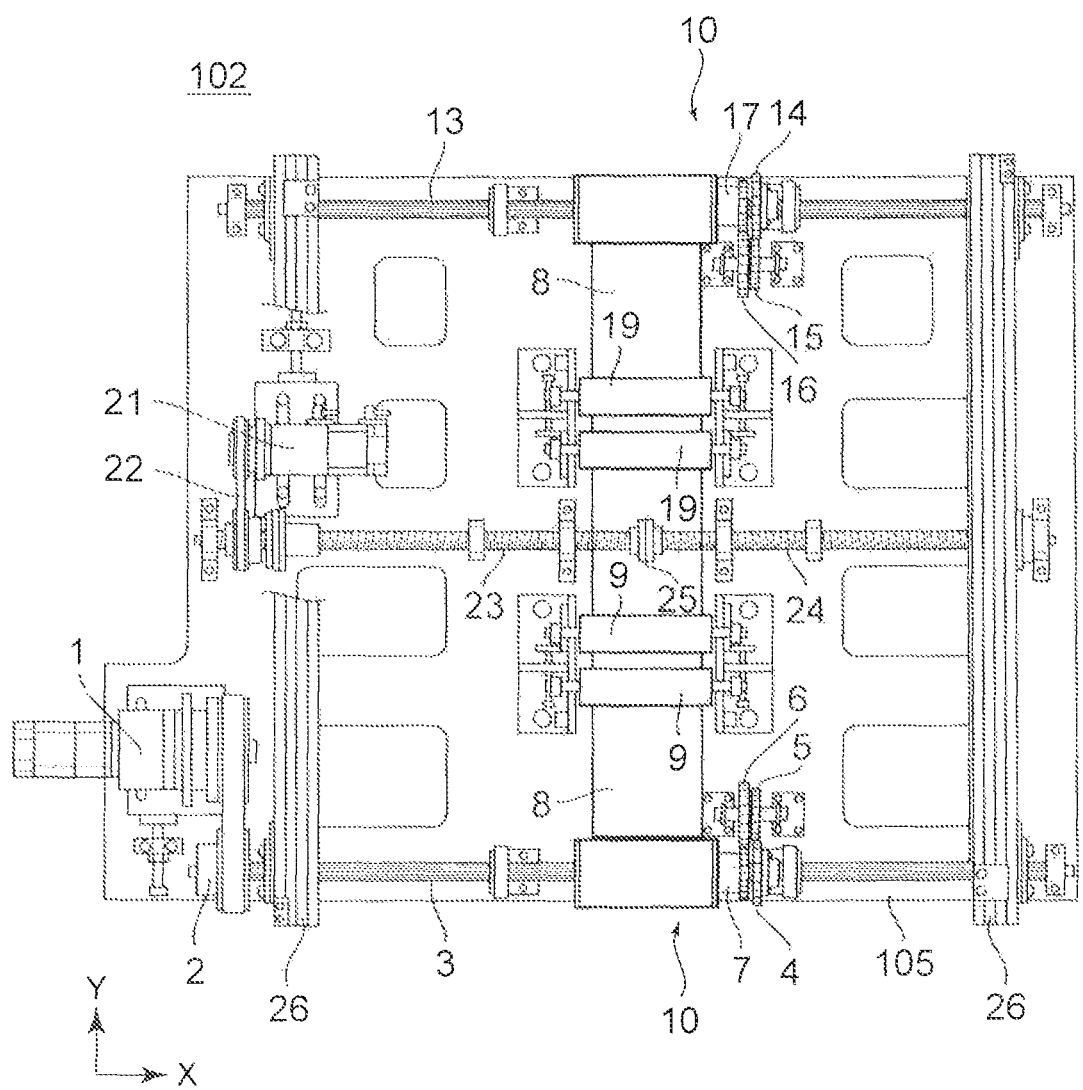
FIG. 2 is a top view showing a structure of a carriage of the transfer apparatus according to a first embodiment.

Embodiments of a transfer apparatus according to the invention are explained in detail based on the drawings. However, the invention is not limited to the embodiments below. The description and drawings below are simplified as appropriate to clarify the explanation.

First Embodiment

A transfer apparatus and a control method of the transfer apparatus according to a first embodiment are explained below with reference to the drawings. In the explanation below, an XYZ three-dimensional orthogonal coordinate system is used to clarify the explanation. A Z direction is a height direction. An X direction is a width direction of the transfer apparatus, in other words, a left-right direction. A Y direction is a front-back direction of the transfer apparatus.

(Overall structure) FIG. 1A is a side view schematically showing an overall structure of the transfer apparatus, and FIG. 1B shows a top view. A shelf 103 is a multistory storage shelf having a plurality of shelf boards. A work 101 is placed on each of the shelf boards of the shelf 103. The work 101 is an object to be transferred and has a rectangular parallelepiped box shape. The shelf 103 stores a plurality of works 101 in different sizes. As a matter of course, shapes and sizes of the shelf 103 or the work 101 are not particularly limited.

The transfer apparatus 100 grips the work 101 placed on the shelf 103. Then, the transfer apparatus 100 moves the gripped work 101 to another location and releases the work 101. By doing so, it is possible to transfer the work 101 from one location on the shelf 103 to another location. The shelf 103 is provided on both front and back of the transfer apparatus 100. In other words, the transfer apparatus 100 is arranged between the two shelves 103. The transfer apparatus 100 is able to arrange the work 101 from one of the shelves 103 to the other shelf 103.

The transfer apparatus 100 is able to move in the X direction. In other words, the transfer apparatus 100 travels between the two shelves 103 along the X direction. For example, the transfer apparatus 100 moves in a sliding fashion along a rail and a guide extending in the X direction. A carriage 102 provided in the transfer apparatus 100 is able to move in an upper-lower direction. In other words, the carriage 102 of the transfer apparatus 100 is lifted and lowered along the Z direction. For example, the carriage 102 of the transfer apparatus 100 moves in a sliding fashion along a rail and a guide extending in the Z direction. This makes it possible to move the work 101 to the shelves 103 at different heights. Thus, the transfer apparatus 100 is able to freely transfer the work 101 place on the shelf 103 to another location.

(Structure of the carriage 102) Next, a structure of the carriage 102, a main part of the transfer apparatus 100, is explained by using FIG. 2. FIG. 2 is a top view showing the structure of the carriage 102. The carriage 102 includes a servomotor for an extending and contracting action 1, a pulley 2, a spline shaft 3, a gear 4, a counter gear 5, a speed-increasing gear 6, a conveyer pulley 7, a conveyer belt 8, idlers 9, a spline shaft 13, a gear 14, a counter gear 15, a speed-increasing gear 16, a conveyer pulley 17, and idlers 19. The pulley 2, the spline shaft 3, the gear 4, the counter gear 5, the speed-increasing gear 6, the conveyer pulley 7, the idlers 9, the spline shaft 13, the gear 14, the counter gear 15, the speed-increasing gear 16, the conveyer pulley 17, and the idlers 19 structure a rotating mechanism 10 that rotates the conveyer belt 8. The carriage 102 includes a servomotor for a gripping action 21, a pulley 22, a right screw 23, a left screw 24, a coupling 25, hand units 26, a base 105, and so on. Illustration of a part of the structure is omitted in FIG. 2 to clarify the explanation.

The base 105 is a flat plate arranged along an XY plane. On the base 105, the servomotor for a gripping action 21~the hand unit 26 are arranged. For example, the servomotor for a gripping action 21, the servomotor for an extending and contracting action 1, the spline shafts 3, 13, and so on are mounted on the base 105 by bolts, brackets, bearings, and so on.

A pair of spline shafts 3, 13 is arranged on the base 105. Each of the spline shafts 3, 13 is arranged along the X axis, and rotates about an axis of rotation in parallel to an X axis. The spline shaft 3 and the spline shaft 13 are arranged in parallel to each other. The two spline shafts 3, 13 are arranged to be separated from each other in the Y direction. The servomotor for an extending and contracting action 1, which generates power, is provided on one end side of the spline shaft 3. The servomotor for an extending and contracting action 1 is connected with the pulley 2. The pulley 2 is connected with the spline shaft 3. Power of the servomotor for an extending and contracting action 1 is transmitted to the spline shaft 3 through the pulley 2. Therefore, the servomotor for an extending and contracting action 1 serves as a shaft driving portion that rotates the spline shaft 3. The number of the spline shafts 3, 13 is not particularly limited, and may be one, three or more.

The carriage 102 has a pair of hand units 26. The spline shafts 3, 13 support the hand units 26 so that the hand units 26 are able to move. The pair of hand units 26 is arranged to be separated from each other in the X direction. The pair of hand units 26 is provided so as to grip the work 101 from both sides. The hand units 26 move in the ±X direction so that an interval between the hand units 26 changes.

(The rotating mechanism 10 of the conveyer belt 8) First of all, the rotating mechanism 10 of the conveyer belt 8 is explained. As stated above, the servomotor for an extending and contracting action 1 rotates the spline shaft 3. Then, power of the servomotor for an extending and contracting action 1 is transmitted to the conveyer belt 8 through the spline shaft 3, and the conveyer belt 8 rotates. It means that the rotating mechanism 10 transmits rotation of the spline shaft 3 to the conveyer belt 8. The rotating mechanism 10 includes the spline shaft 3, the gear 4, the counter gear 5, the speed-increasing gear 6, and the conveyer pulley 7.

The spline shaft 3 is connected with the gear 4. The gear 4 is connected with the counter gear 5. The gear 4 is larger than the counter gear 5. The counter gear 5 is connected with the speed-increasing gear 6. The speed-increasing gear 6 is connected with the conveyer pulley 7. Therefore, rotation of the spline shaft 3 is transmitted to the conveyer pulley 7 through the gear 4, the counter gear 5, and the speed-increasing gear 6. The gear 4, the counter gear 5, the speed-increasing gear 6, and the conveyer pulley 7 rotate about axes, respectively, which are parallel to the X direction.

The conveyer belt 8 is provided from the conveyer pulley 7 through the conveyer pulley 17. The conveyer pulley 7 and the conveyer pulley 17 support the conveyer belt 8 so that the conveyer belt 8 is able to rotate. Further, the idlers 9, 19, which prevent flexure of the conveyer belt 8, are provided on an inner peripheral side of the conveyer belt 8. In other words, the conveyer pulleys 7, 17 and the idlers 9, 19 are arranged so as to apply tension to the conveyer belt 8. The idler 9 and the idler 19 are arranged symmetrically with respect to a straight line parallel to the X direction.

Axes of rotation of the conveyer pulleys 7, 17 and the idlers 9, 19 are parallel to the X direction. The conveyer pulley 7 and the conveyer pulley 17 are arranged to be separated from each other in the Y direction, and the idlers 9, 19 are arranged between the conveyer pulley 7 and the conveyer pulley 17. Therefore, the conveyer belt 8 is rotated by power of the servomotor for an extending and contracting action 1. Thus, when the work 101 is placed on the conveyer belt 8, the servomotor for an extending and contracting action 1 rotates the conveyer belt 8. This makes it possible to convey the work 101 in the Y direction. As stated above, the conveyer belt 8 rotates as the rotating mechanism 10 rotates.

A power transmission mechanism from the spline shaft 3 to the conveyer pulley 7, and a power transmission mechanism from the spline shaft 13 to the conveyer pulley 17 are arranged symmetrically through the conveyer belt 8. In short, the power transmission mechanism from the spline shaft 3 to the conveyer pulley 7, and the power transmission mechanism from the spline shaft 13 to the conveyer pulley 17 are arranged line-symmetrically with respect to a straight line parallel to the X direction. Therefore, rotation of the conveyer belt 8 is transmitted to the spline shaft 13 through the conveyer pulley 17, the speed-increasing gear 16, the counter gear 15, and the gear 14. The spline shaft 13 is rotated by power of the servomotor for an extending and contracting action 1. The spline shaft 3 and the spline shaft 13 rotate in the same direction at the same rotation speed. Thus, the servomotor for an extending and contracting action 1 generates a conveyance driving force for the conveyer belt 8. Further, it is possible to reverse a conveyance direction by reversing a rotation direction of the servomotor for an extending and contracting action 1.

Figure 3:
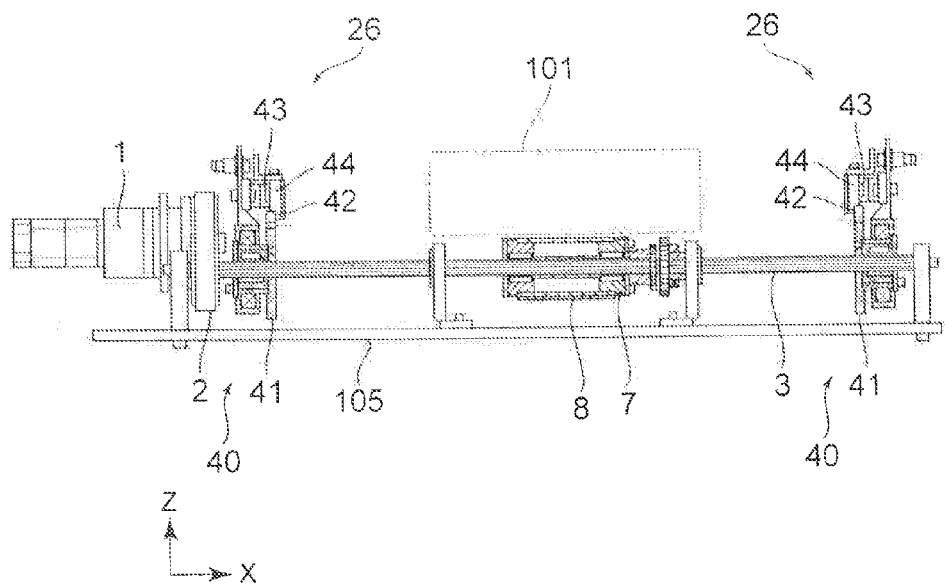
FIG. 3 is a front view showing a rotating mechanism of a conveyer belt.

(An extension and contraction mechanism of the hand unit 26) Next, the hand unit 26 and a structure of an extension and contraction mechanism of the hand unit 26 are explained by using FIG. 3. FIG. 3 is a front view showing the hand unit 26. The hand unit 26 includes a pinion 41, a rack 42, a telescopic bearing 43, and a hand 44. An extension and contraction mechanism 40, which transmits power of the servomotor for an extending and contracting action 1 to the hand 44, has the pulley 2, the spline shaft 3, the pinion 41, the rack 42, and the telescopic bearing 43. The hand 44 is a hand plate that abuts on the work 101, and the hand 44 grips the work 101 from both sides of the work 101.

The servomotor for an extending and contracting action 1 generates power for extension and contraction of the pair of hand units 26. As stated earlier, power from the servomotor for an extending and contracting action 1 is transmitted to the spline shaft 3 through the pulley 2. The spline shaft 3 is connected with the pinion 41. Therefore, the pinion 41 is rotated by rotation of the spline shaft 3. The pinion 41 rotates about an axis parallel to the X direction. The pinion 41 is connected with the rack 42 extending in the Y direction. Therefore, as the pinion 41 rotates, the rack 42 moves in the Y direction.

The rack 42 and the hand 44 are connected with each other through the telescopic bearing 43. The telescopic bearing 43 is provided to be able to extend and contract in the +Y direction and the −Y direction, and support the hand 44. This means that the Y direction is an extension and contraction direction of the extension and contraction mechanism 40. As the rack 42 moves in the Y direction, the hand 44 moves in the Y direction. Thus, the rack 42 and the pinion 41 convert a rotative motion of the servomotor for an extending and contracting action 1 into a linear motion. Therefore, the hand 44 moves linearly along the Y direction.

The hand unit 26 on the left side and the hand unit 26 on the right side are similar to each other. In other words, the extension and contraction mechanism 40 of the hand unit 26 on the left side is similar to the extension and contraction mechanism 40 of the hand unit 26 on the right side. For example, the pair of hand units 26 is arranged symmetrically with respect to a straight line parallel to the Y direction. Therefore, the hands 44, which are arranged to be separated from each other on the left and right, move in conjunction with one another. This means that the two hands 44 move frontward and backward in the same direction at the same speed. As stated above, the hand unit 26 has the extension and contraction mechanism 40 that extends and contracts in the front-back direction, and extends and contracts to a position of the shelf 103. As the spline shaft 3 rotates, the hand unit 26 extends and contracts to a gripping position where the work 101 is gripped, or to a releasing position where the work 101 is released.

As stated above, the servomotor for an extending and contracting action 1 extends and contracts the hand unit 26 by rotating the spline shaft 3. In other words, as the servomotor for an extending and contracting action 1 extends and contracts the extension and contraction mechanism 40, the hand unit 26 extends and contracts. Therefore, it is possible to extend and contract the two hand units 26 with the single servomotor for an extending and contracting action 1. Thus, the hands 44 of the hand units 26 move in the Y direction to a desired gripping position or releasing position.

As described above, the servomotor for an extending and contracting action 1 generates power not only for an extending and contracting action of the hand unit 26, but also for a conveying action of the conveyer belt 8. For example, the work 101 is moved jointly by an extending and contracting action of the hand unit 26 and a conveying action of the conveyer belt 8. In short, the hand units 26 that grip the work 101 on the rotating conveyer belt 8 extend and contract. Hence, it is possible to transfer a heavy work 101.

Figure 4:
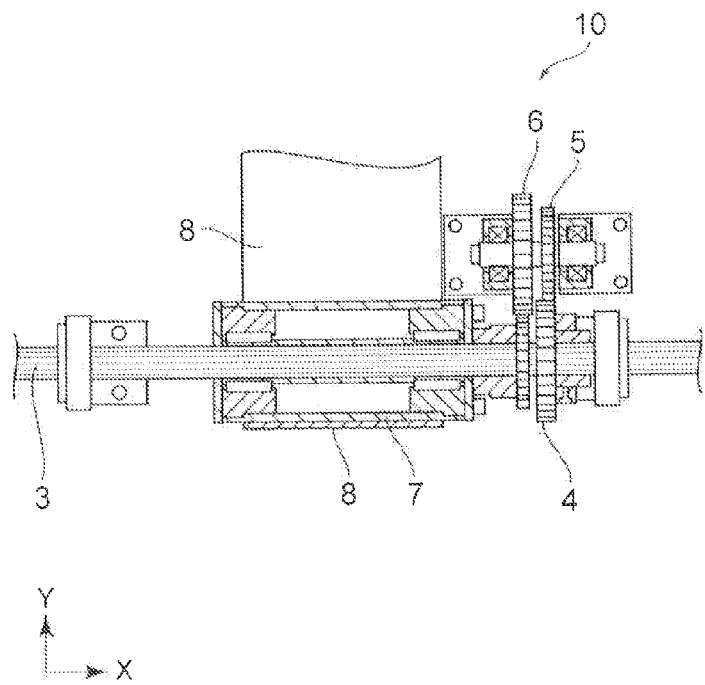
FIG. 4 is a top view showing an extension and contraction mechanism of a hand unit.

(A mechanism for an equal-speed action of the conveyer belt 8 and the hand unit 26) In this embodiment, extension and contraction speed of the hand unit 26 and conveyance speed of the conveyer belt 8 are equalized. A mechanism for equalizing the extension and contraction speed of the hand unit 26 and the conveyance speed of the conveyer belt 8 is explained below by using FIG. 4. FIG. 4 is a top view showing a main part of the rotating mechanism 10. Although FIG. 4 shows the rotating mechanism 10 connected with the spline shaft 3, a similar rotating mechanism 10 is also provided in the spline shaft 13 as described earlier.

As shown in FIG. 4, the rotating mechanism 10 of the conveyer belt 8 includes the spline shaft 3, the gear 4, the counter gear 5, the speed-increasing gear 6, and the conveyer pulley 7. The spline shaft 3 passes through the conveyer pulley 7 and rotates coaxially with the conveyer pulley 7. In short, the spline shaft 3 passes through a through hole provided in the conveyer pulley 7. Therefore, the spline shaft 3 is arranged to pass on an inner side of the conveyer belt 8. Then, the counter gear 5 and the speed-increasing gear 6 rotate coaxially with each other.

As shown in FIG. 3, a conveying surface of the conveyer belt 8 and a tooth surface of the rack 42 of the hand unit 26 are in different heights. For example, in order to pass and receive the work 101, a height is always larger on a side where the work 101 is passed, so that the work 101 is easily flown to a receiving side. To be more specific, the tooth surface of the rack 42 of the hand unit 26 is higher than the conveying surface of the conveyer belt 8. This way, the work 101 gripped by the hand units 26 is placed at a higher position than the conveying surface of the conveyer belt 8. It is possible to easily transfer the work 101, which is gripped by the hand units 26, onto the conveyer belt 8.

Figure 5:
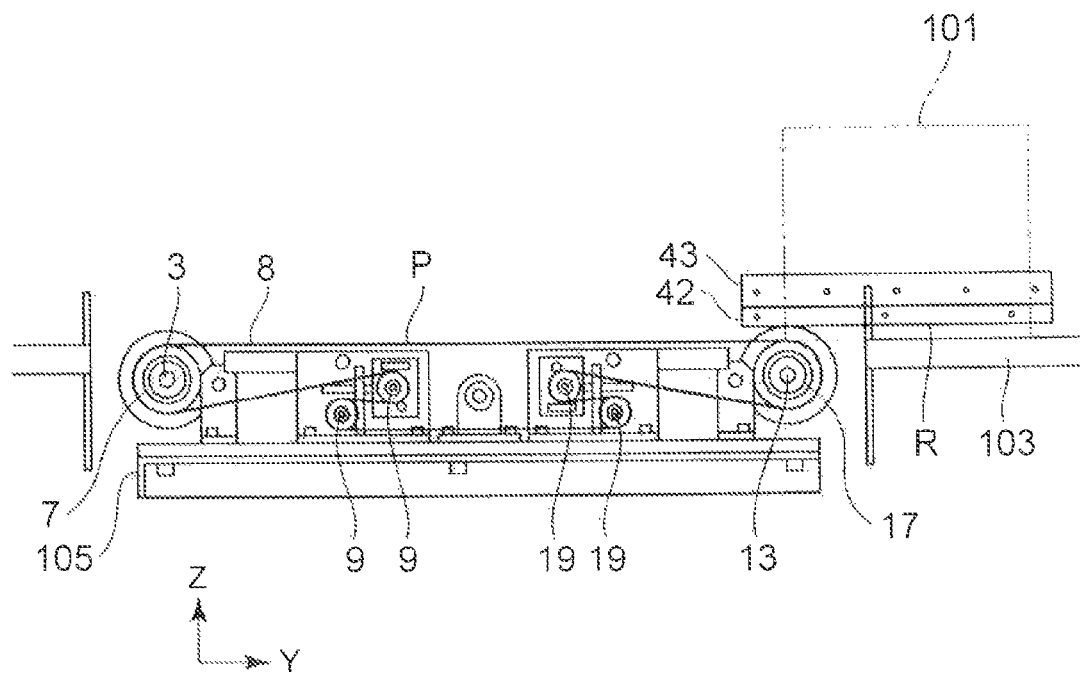
FIG. 5 is a side view showing the extension and contraction mechanism of the hand unit.

The conveying surface of the conveyer belt 8 is arranged at a lower position than the tooth surface of the rack 42 of the hand unit 26. Positions of the conveying surface of the conveyer belt 8 and the tooth surface of the rack 42 are shown in FIG. 5. FIG. 5 is a side view showing a part of the structure of the rotating mechanism 10. The conveying surface P of the conveyer belt 8 is lower than the tooth surface R of the rack 42 of the hand unit 26. Therefore, the conveying surface P of the conveyer belt 8 is closer to a center of axis of the spline shaft 3 than the tooth surface R of the rack 42 in the Z direction.

Hence, in this embodiment, the speed-increasing gear 6 is used in the rotating mechanism 10 of the conveyer belt 8 as shown in FIG. 4. In other words, although the spline shaft 3 passes through the conveyer pulley 7, the spline shaft 3 is not directly connected with the conveyer pulley 7. Rotation of the spline shaft 3 is transmitted to the conveyer pulley 7 through the counter gear 5 and the speed-increasing gear 6. Thus, it is possible to increase rotation speed of the conveyer pulley 7 compared to that of the pinion 41. In short, since the pinion 41 is directly connected with the spline shaft 3, the pinion 41 and the spline shaft 3 rotate coaxially with each other at equal speed. Meanwhile, since the speed-increasing gear 6 is provided between the spline shaft 3 and the conveyer pulley 7, the conveyer pulley 7 rotates faster than the spline shaft 3. For example, because the counter gear 5 is smaller than the gear 4, rotation speed is increased. Further, the speed-increasing gear 6 increases rotation speed.

This way, the counter gear 5 and the speed-increasing gear 6 equalize conveyance speed of the conveyer belt 8 and extension and contraction speed of the hand unit 26. Because of a difference in height between the conveying surface P of the conveyer belt 8 and the tooth surface R of the rack 42 of the hand unit 26, it is possible to prevent unequal speed. As a matter of course, a speed-reducing gear may be used in the extension and contraction mechanism 40 of the hand unit 26, instead of using the speed-increasing gear 6. This means that an appropriate speed change gear may be used depending on a difference in distance of the conveying surface of the conveyer belt 8 and the tooth surface of the rack 42 from the spline shaft 3. It is possible to use a speed changer in one of or both of the rotating mechanism 10 of the conveyer belt 8 and the extension and contraction mechanism 40 of the hand unit 26. Thus, it becomes possible to equalize conveyance speed of the conveyer belt 8 on the conveying surface P, and the extension and contraction speed of the hand 44. Hence, the carriage 102 carries in and discharges the work 101 appropriately.

Figure 6:
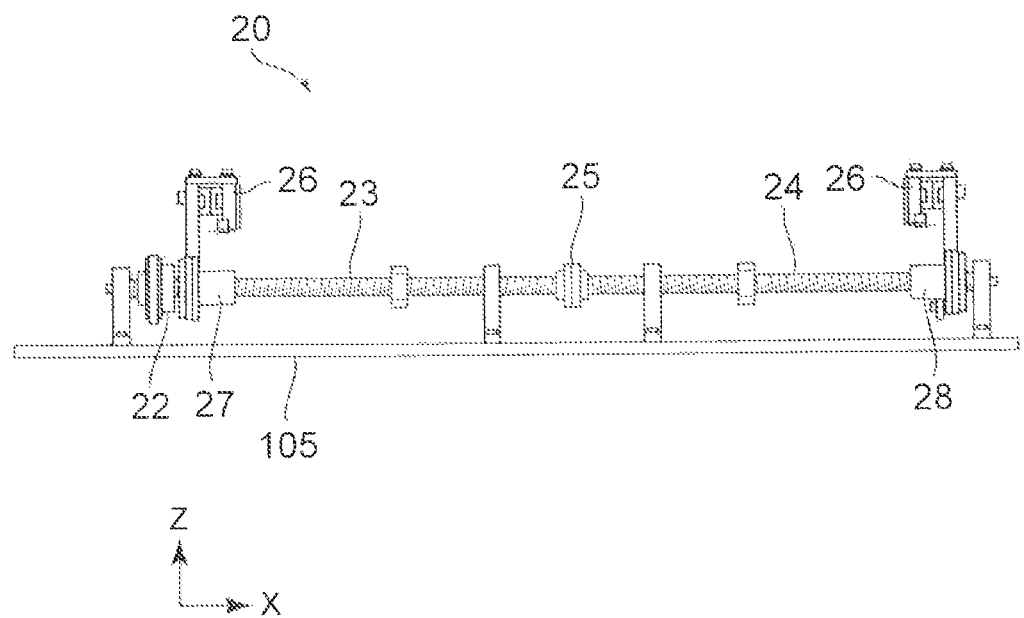
FIG. 6 is a detailed front view showing a gripping mechanism of the hand unit.

(A gripping action of the hand unit 26) Next, a gripping action of the pair of hand units 26 is explained by using FIG. 6. FIG. 6 is a front view showing a gripping mechanism 20 of the hand unit 26. The gripping mechanism 20 includes the pulley 22, the right screw 23, the left screw 24, the coupling 25, the hand units 26, a right screw nut 27, and a left screw nut 28. The servomotor for a gripping action 21 is a gripping driving portion that drives the gripping mechanism 20. This means that the servomotor for a gripping action 21 generates power to be transmitted to the gripping mechanism 20.

The right screw 23 and the left screw 24 are provided along the X direction. The coupling 25 connects the right screw 23 with the left screw 24 integrally. The right screw 23 and the left screw 24 rotate about an axis parallel to the X direction. This means that the right screw 23 and the left screw 24 are supported by the base 105 so as to be able to rotate. One of the pair of hand units 26 is connected with the right screw 23 through the right screw nut 27, and the other is connected with the left screw 24 through the left screw nut 28. In other words, the right screw 23 and the left screw 24 support the pair of hand units 26 so as to be able to drive the hand units 26.

Rotative power of the servomotor for a gripping action 21 is transmitted to the right screw 23 and the left screw 24 through the pulley 22. Rotation of the right screw 23 and the left screw 24 is transmitted to the hand units 26 through the right screw nut 27 and the left screw nut 28. The right screw 23 and the left screw 24 are, for example, ball screws. Therefore, a rotative motion of the servomotor for a gripping action 21 is converted into a linear motion. Thus, the hand units 26 move in the X direction. Since the right screw 23 and the left screw 24 are used, the pair of hand units 26 moves in opposite directions. Thus, the hand units 26 move in the X direction toward and away from each other. By opening and closing the hand units 26, it is possible to clamp and unclamp the work 101.

For example, as the pair of hand units 26 move closer to each other, the hand units 26 grip the work 101. As the pair of hand units 26 is separated from each other, the hand units 26 release the gripped work 101. For example, as the hand unit 26 on the left side moves in the +X direction, and the hand unit 26 on the right side moves in the −X direction, an interval between the hand units 26 is narrowed, thereby damping the work 101. Alternatively, as the hand unit 26 on the left side moves in the −X direction, and the hand unit 26 on the right side moves in the +X direction, the interval between the hand units 26 is increased, thereby unclamping the work 101. This way, the hand units 26 act to move toward and away from each other.

As stated above, as the interval between the pair of hand units 26 changes, the hand units 26 grip and release the work 101. This means that, as the servomotor for a gripping action 21 changes a distance between the hand units 26, the clamping action and the unclamping action are carried out. The servomotor for a gripping action 21 is torque-controlled in order to handle a multiple kinds of works 101. Then, positional information when set torque is reached is referred, a size of the work 101 and clamping of the work 101 are confirmed. Thereafter, once the work is clamped, the servomotor for an extending and contracting action 1 is activated to begin conveyance.

(Transfer method) Next, a transfer method by using the transfer apparatus 100 is explained. First of all, an action of carrying in the work 101 placed on the shelf 103 onto the carriage 102 is explained. The carriage 102 is moved in the X direction and the Z direction to a position of the target work 101. The pair of hand units 26 is in a state of being separated from each other more than a width of the work 101, or in an open state. The servomotor for an extending and contracting action 1 extends the hand units 26 to the shelf 103. Then, in the Y direction, when the hand units 26 move to a position of the work 101 on the shelf 103, or the gripping position, the servomotor for a gripping action 21 moves the pair of hand units 26 closer to each other. This means that the servomotor for a gripping action 21 is driven to narrow the interval between the pair of hands 44 that are supported by the spline shafts 3, 13 so that the hands 44 are able to move. Thus, the pair of hand units 26 is in a closed state and clamps the work 101.

In a state where the work 101 is gripped, the servomotor for an extending and contracting action 1 rotates the spline shafts 3, 13, and extends and contracts the hand units 26. This means that the servomotor for an extending and contracting action 1 contracts the hand units 26 and returns the hand units 26 to original positions. At this time, the work 101 placed on the shelf 103 is carried in onto the conveyer belt 8. Then, the conveyer belt 8, which conveys the work 101 at equal speed to that of the hand units 26, conveys the work 101. This way, the conveyer belt 8 and the hand units 26 jointly convey the work 101 placed on the shelf 103 onto the carriage 102.

Next, an action of discharging the work 101 placed on the carriage 102 to the shelf 103 is explained. The carriage 102 moves in the X direction and the Z direction to a position where the work 101 is transferred. By driving the servomotor for a gripping action 21, the pair of hand units 26 grips the work 101 located on the conveyer belt 8. In the case where the hand units 26 already grip the work 101, it is not necessary to drive the servomotor for a gripping action 21. Then, as the servomotor for an extending and contracting action 1 is driven, the conveyer belt 8 is rotated and the hand unit 26 is extended. This means that, in a state where the hand units 26 grip the work 101, the conveyer belt 8 moves the work 101 towards the shelf 103.

Then, the hand units 26 are extended to a releasing position on the shelf 103, and discharge the work 101 on the shelf 103. The servomotor for a gripping action 21 is driven to move the pair of hand units 26 away from each other to unclamp the work 101. Thus, the work 101 is released on the shelf 103, and the work 101 is transferred. Thereafter, the servomotor for an extending and contracting action 1 is activated to return the hand units 26 to the original positions. This way, it is possible to transfer the work 101 to the shelf 103.

With the above-mentioned structure, a transfer action is carried out with a small number of servomotors. In other words, an action of the pair of hand unit 26 to move toward and away from each other is carried out by the single servomotor for a gripping action 21. Also, an extending and contracting action of the hand units 26 and a rotative action of the conveyer belt 8 are carried out by the single servomotor for an extending and contracting action 1. This way, the transfer action is carried out only by the two servomotors in total. Thus, it is possible to reduce costs for parts and manufacturing significantly.

The spline shafts 3, 13 guide the hand units 26 to move toward and away from each other. For example, the spline shafts 3, 13 pass through the pinions 41. Then, the hand units 26 move linearly along the spline shafts 3, 13. Thus, it is possible to support the pair of hand units 26 that moves toward and away from each other with good. balance. Therefore, even a heavy work 101 is transferred adequately.

By using the speed-increasing gear 6 and so on, conveyance speed of the conveyer belt 8 and extension and contraction speed of the hand units 26 are equalized. This means that conveyance of the work 101 on the conveyer belt 8 and an extending and contracting action of the hand units 26 are synchronized with each other. Thus, it is possible to carry in and discharge the work adequately.

Second Embodiment

Figure 7:
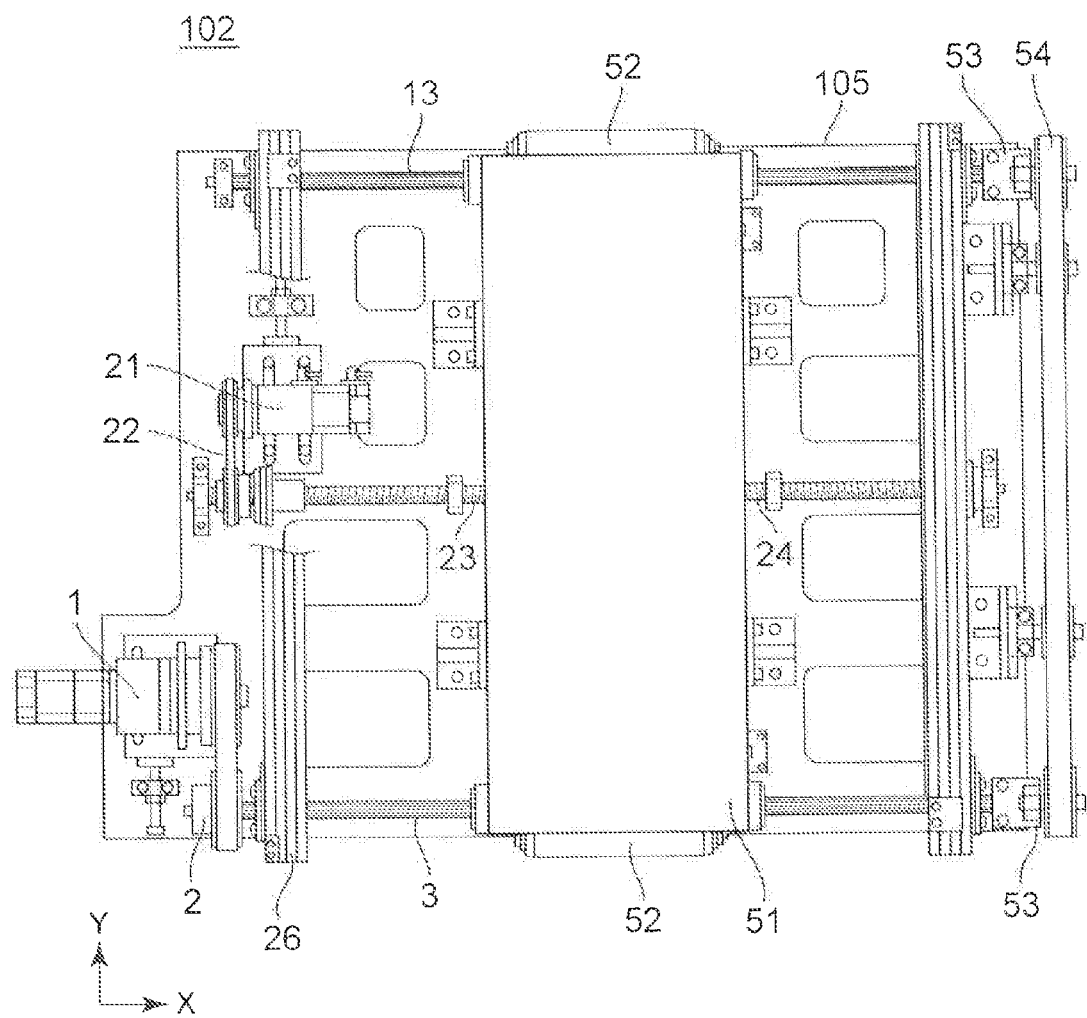
FIG. 7 is a top view showing a structure of a transfer apparatus according to a second embodiment.
Figure 8:
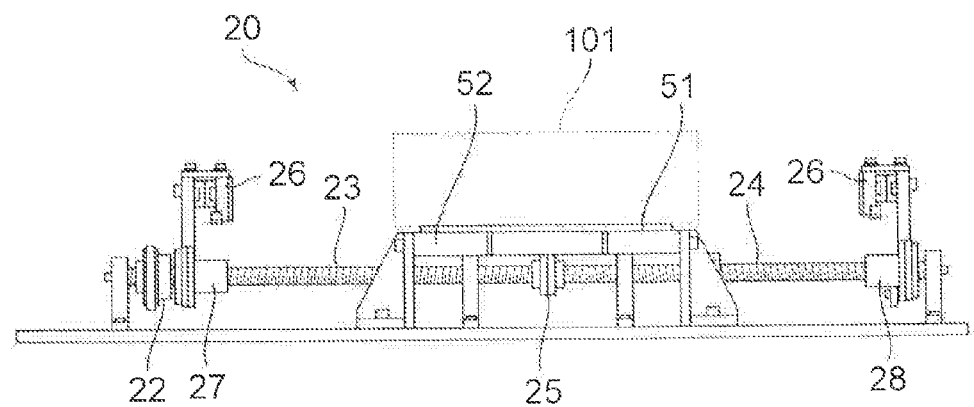
FIG. 8 is a front view showing a gripping mechanism of the transfer apparatus according to the second embodiment.
Figure 9:
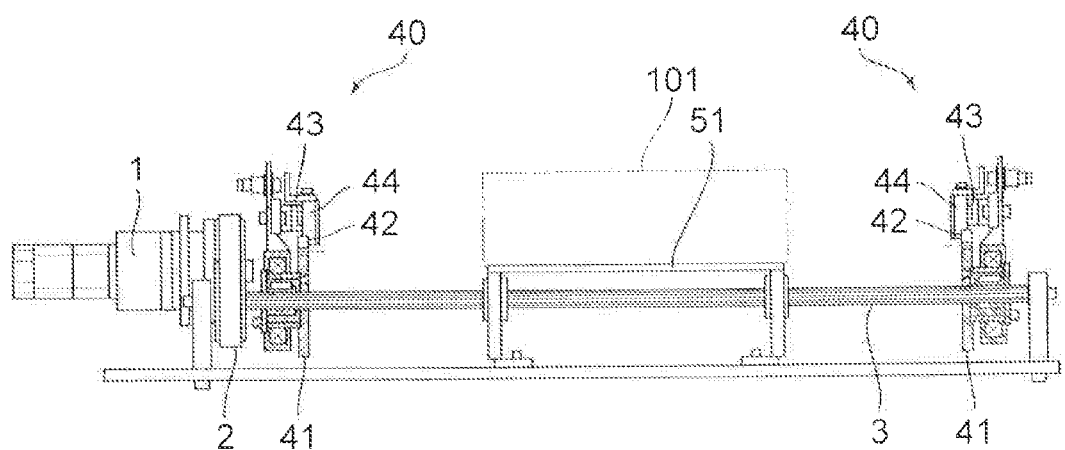
FIG. 9 is a front view showing an extension and contraction mechanism of the transfer apparatus according to the second embodiment.

A transfer apparatus 100 according to this embodiment is explained by using FIG. 7 to FIG. 9. FIG. 7 is a top view showing a structure of a carriage 102. FIG. 8 is a front view showing a structure of a gripping mechanism 20. FIG. 9 is a front view showing a structure of an extension and contraction mechanism 40. In the transfer apparatus according to this embodiment, a slider board 51 is provided instead of the conveyer belt 8. Since a basic structure of the transfer apparatus 100 is similar to that of the first embodiment, explanation is omitted. For example, the extension and contraction mechanism 40 of a hand unit 26, and the gripping mechanism 20 are similar to those of the first embodiment. Therefore, explanation is omitted.

The slider board 51 is arranged instead of the conveyer belt 8. For example, the slider board 51 is fixed at height corresponding to a conveying surface of the conveyer belt 8. The slider board 51 is a sheet with small frictional resistance, and is arranged so that longitudinal direction of the slider board 51 is coincident with the Y direction. A work 101 carried in by the hand units 26 slides on the slider board 51 in the Y direction. Because of an extending and contracting action of the hand units 26, the work 101 placed on the slider board 51 is moved.

In this embodiment, the carriage 102 includes timing pulleys 53 and a timing belt 54. The timing pulleys 53 and the timing belt 54 are provided instead of the rotating mechanism 10 of the first embodiment. The plurality of timing pulleys 53 is supported by the base 105 so that the timing pulleys 53 are able to rotate. The timing belt 54 is supported by the timing pulleys 53 so that the timing belt 54 is able to rotate. One of the timing pulleys 53 rotates coaxially with a spline shaft 3. The other timing pulley 53 rotates coaxially with a spline shaft 13.

The timing pulleys 53 and the timing belt 54 connect the spline shaft 3 and the spline shaft 13 with each other. For example, the timing pulleys 53 are provided on the +X side of the spline shafts 3, 13. The timing pulley 53 rotates in conjunction with the spline shaft 3. Power from a servomotor for an extending and contracting action 1 is transmitted to the spline shaft 13 through the spline shaft 3, the timing pulleys 53, the timing belt 54 and so on. Thus, the two spline shafts 3, 13 are driven to rotate in synchronization with each other.

In this embodiment, rollers 52 are provided on both sides of the slider board 51. In other words, one of the two rollers 52 is arranged on the +Y side of the slider board 51, and the other one is arranged on the −Y side. The slider board 51 is arranged between the two rollers 52. The rollers 52 are supported by the base 105 so that the rollers 52 are able to rotate about the X direction as a rotating axis. The rollers 52 are arranged near the slider board 51, that is, between the slider board 51 and the shelves 103 shown in FIG. 1A and FIG. 1B. As shown in FIG. 8, the rollers 52 are located at generally the same height as the conveying surface of the slider board 51.

When the work 101 is discharged to the shelf 103, or when the work 101 is carried in from the shelf 103, the work 101 passes above the rollers 52. As the rollers 52 rotate, the work 101 is sent out. In other words, the rollers 52 help the work 101 carried in from the shelf 103 to the slider board 51, and help the work 101 discharged from the slider board 51 to the shelf 103. Thus, it is possible to transfer the work 101 easily.

In this embodiment, the rollers 52 are free-type rollers that are not driven by a motor and so on. As a matter of course, the rollers 52 may be of a type with a drive force, which is driven by a motor. For example, when the work 101 is light, the free-type rollers are preferred. Thus, no driving mechanism is required for the rollers 52, and a structure of the apparatus is simplified. When transferring a heavy load, the type of rollers with drive force is preferred. The servomotor for an extending and contracting action 1 or other motor may generate drive force for the rollers 52.

As stated above, the work 101 slides on the slider board along with extension and contraction of the hand units 26. In this embodiment, it is possible to re-hold the work 101 by replacing the conveyer belt 8 with the slider board 51. Therefore, it is possible to have a longer stroke than a stroke of a telescopic bearing 43 of the hand unit 26. This action is explained below.

For example, similarly to the first embodiment, the hand units 26 carry in the work 101 onto the slider board 51. Then, the servomotor for a gripping action 21 is activated and the hand units 26 unclamp the work 101. Once the work 101 is unclamped, the servomotor for an extending and contracting action 1 is activated and return the hand units 26 to original positions. At this time, the extension and contraction mechanism 40 is contracted while the work 101 remains still. Thereafter, the servomotor for a gripping action 21 is activated, and the hand units 26 clamp the work 101 again. When the servomotor for an extending and contracting action 1 is activated in a state where the work 101 is clamped, the work 101 further moves in the same direction as the conveyance direction. By carrying out the extending and contracting action twice, it is possible to move the work 101 with a stroke that is twice the stroke of the telescopic bearing 43. Of course, it is possible to move the work 101 with a stroke twice or more the stroke of the telescopic bearing 43 by carrying out the above process repeatedly.

By re-holding the work 101 as stated above, it is possible to handle the works 101 in various sizes. It is also possible to change a transfer position within the shelf 103 in the Y direction. It is possible to adjust the transfer position on the shelf 103 depending on an amount of extension and contraction of the extension and contraction mechanism 40 when the work 101 is unclamped. In other words, it is possible to freely adjust a stroke for carrying in and discharging the work 101. Therefore, it is possible to arbitrarily change the transfer position to the shelf 103 in the Y direction. For example, it is possible to transfer the work 101 on a far side or a near side of the shelf 103 in the Y direction.

Third Embodiment

Figure 10:
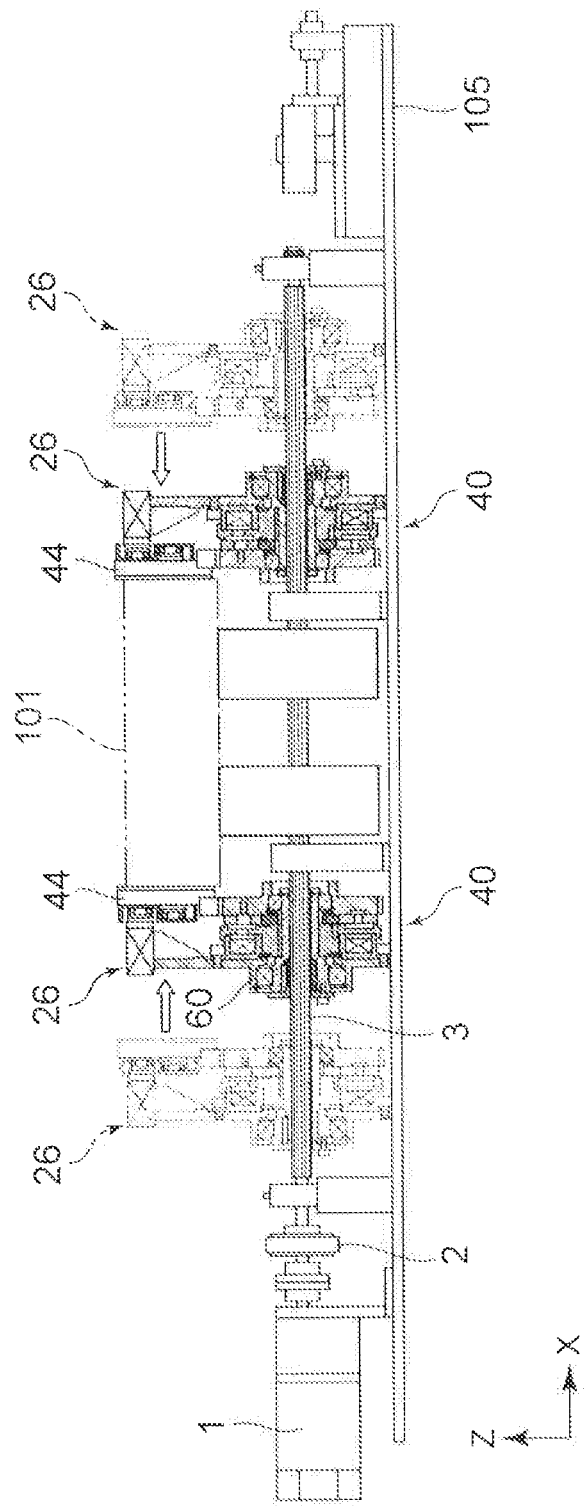
FIG. 10 is a front view showing a clutch part of a transfer apparatus according to a third embodiment.
Figure 11:
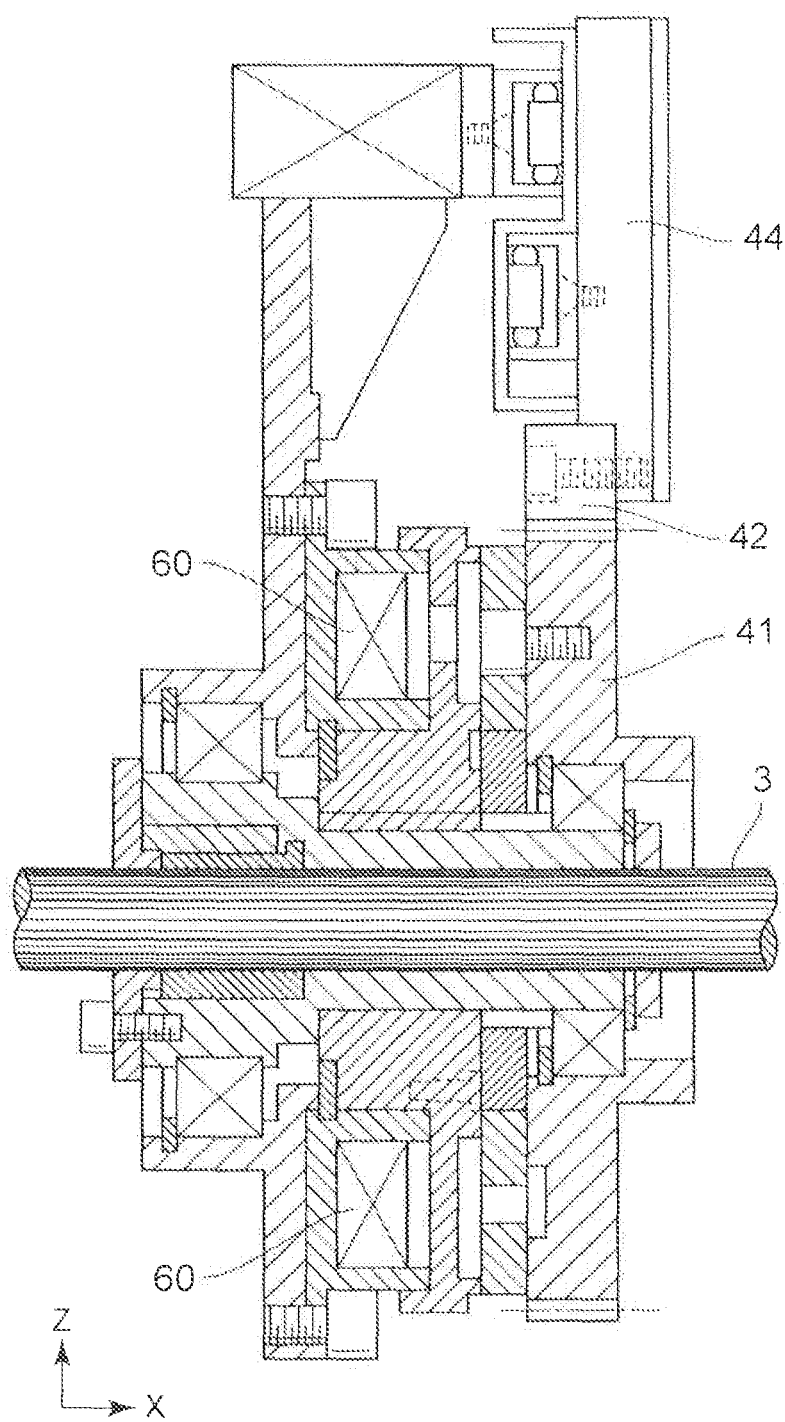
FIG. 11 is a detailed view showing the clutch of the transfer apparatus according to the third embodiment.

In a transfer apparatus according to this embodiment, a clutch is provided in the rotating mechanism 10 of the conveyer belt 8 of the first embodiment. The transfer apparatus according to this embodiment is explained by using FIG. 10 and FIG. 11. FIG. 10 is a front view showing a structure of a clutch connected with a spline shaft 3. FIG. 11 is a view showing details of the clutch. FIG. 10 shows a hand unit 26 clamping a work 101 and the hand unit 26 unclamping a work 101. A basic structure of the transfer apparatus according to this embodiment is similar to the transfer apparatus 100 of the first embodiment. Since the structure other than the clutch is similar to that of the first embodiment, explanation is omitted.

In this embodiment, the clutch 60 is connected with a spline shaft 3. The spline shaft 3 is connected with the rotating mechanism 10 (not shown in FIG. 10 and FIG. 11) described in the first embodiment through the clutch 60. The clutch 60 blocks power transmission from the spline shaft 3 to the conveyer belt 8. By connecting the clutch 60, rotation of the spline shaft 3 is transmitted to the conveyer belt 8, and by disconnecting the clutch 60, rotation of the spline shaft 3 is not transmitted to the conveyer belt 8.

Therefore, an extension and contraction mechanism 40 is able to extend and contract the hand units 26 in a state where an operation of the rotating mechanism 10 is stopped. In other words, the extension and contraction mechanism 40 extends and contracts the hand units 26 in a state where the work 101 remains still on the conveyer belt 8. Thus, it is possible to re-hold the work 101 similarly to the second embodiment.

For example, after the work 101 is carried in onto the conveyer belt 8, the clutch 60 is disconnected, and the servomotor for a gripping action 21 is driven to unclamp the work 101. In a state where the work 101 is undamped and the clutch 60 is disconnected, a servomotor for an extending and contracting action 1 is driven to extend and contract the extension and contraction mechanism 40. At this time, the extension and contraction mechanism 40 is contracted while the work 101 remains still. Once the servomotor for a gripping action 21 drives the hand unit 26 thereafter, the hand units 26 clamp the work 101 again. Then, the clutch 60 is connected in the state where the work 101 is clamped. Once the clutch 60 is connected, the servomotor for an extending and contracting action 1 is driven to extend the extension and contraction mechanism 40.

By doing so, a similar effect to that of the second embodiment is obtained. This means that it is possible to move the work 101 by a stroke that is twice or more the stroke of the telescopic bearing 43. It is possible to transfer the work 101 in different sizes to a desired position. It means that the work 101 is transferred to an arbitrary position on the shelf 103. It is possible to adjust a transfer position on the shelf 103 depending on an amount of extension and contraction of the extension and contraction mechanism 40 in the state where the clutch 60 is disconnected. Further, since the conveyer belt 8 is driven, it is possible to transfer a heavier work 101 adequately.

The invention is not limited to the foregoing embodiments, and may be changed without departing from the gist of the invention.

What is claimed is:

1. A transfer apparatus comprising:
   a gripping mechanism that grips and releases an object by changing an interval between a pair of hands;
   a gripping device portion that drives the gripping mechanism;
   at least one shaft that supports the pair of hands so that the hands are able to move;
   a shaft driving portion that rotates the shaft;
   an extension and contraction mechanism that is extended and contracted by rotation of the shaft so as to move the hands to a gripping position or a releasing position;
   a conveyer belt on which the object gripped by the gripping mechanism is placed; and
   a transmission mechanism that transmits rotation of the shaft to the conveyer belt.

2. The transfer apparatus according to claim 1, wherein conveyance speed of the conveyer belt on a conveying surface and extension and contraction speed of the extension and contraction mechanism are equalized.

3. The transfer apparatus according to claim 1, further comprising
   a clutch that blocks power transmission from the shaft to the conveyer belt.

4. The transfer apparatus according to claim 1, further comprising a slider board on which the object gripped by the gripping mechanism is placed, wherein the object slides on the slider board due to an extending and contracting action of the extension and contraction mechanism.

5. The transfer apparatus according to claim 1, wherein the shaft includes a first shaft, and a second shaft that is provided to be separated from the first shaft in an extending and contracting direction of the extension and contraction mechanism.

6. A transfer method comprising:

driving a gripping driving portion so as to narrow an interval between a pair of hands supported by a shaft so that the hands are able to move;

gripping an object by using the gripping driving portion by moving the pair of hands towards each other along the shaft;

rotating the shaft by using a shaft driving portion in a state where the pair of hands grips the object;

extending and contracting an extension and contraction mechanism of the pair of hands by rotation of the shaft;

moving the pair of hands to a releasing position of the object by extension and contraction of the extension and contraction mechanism;

releasing the object as the gripping driving portion drives the pair of hands that has moved to the releasing position; and placing the object gripped by the pair of hands onto a conveyer belt by extending and contracting the extension and contraction mechanism, wherein the conveyer belt rotates due to rotation of the shaft.

7. The transfer method according to claim 6, wherein conveyance speed of the conveyer belt on a conveying surface and extension and contraction speed of the pair of hands are equalized.

8. The transfer method according to claim 6, further comprising blocking power transmission from the shaft to the conveyer belt by using a clutch; and extending and contracting the pair of hands in a state where the clutch blocks power transmission to the conveyer belt and the object is released from the pair of hands.

9. The transfer method according to claim 6, further comprising placing the object gripped by the pair of hands onto a slider board by extending and contracting the extension and contraction mechanism, wherein the object slides on the slider board due to extension and contraction of the pair of hands.

10. The transfer method according to claim 6, wherein the shaft includes a first shaft, and a second shaft that is provided to be separated from the first shaft in an extending and contracting direction of the extension and contraction mechanism.

* * * * *